United States Patent [19]
Kramer et al.

[11] Patent Number: 5,946,859
[45] Date of Patent: Sep. 7, 1999

[54] SAFETY PROBLEM SOLUTION WITH MOVEMENT CONTROL SYSTEM

[75] Inventors: William E. Kramer, Wolcott; William R. Klimley, Rochester, both of N.Y.

[73] Assignee: Xerox Corporation, Stamford, Conn.

[21] Appl. No.: 09/046,021

[22] Filed: Mar. 23, 1998

[51] Int. Cl.[6] .............................. F16P 3/00; F16H 19/04; E05F 11/54
[52] U.S. Cl. ............ 49/362; 74/89.17; 74/422; 74/608; 384/42; 384/58
[58] Field of Search .................... 74/89.17, 422, 74/608; 49/362; 384/42, 58

[56] References Cited

U.S. PATENT DOCUMENTS

| | | | |
|---|---|---|---|
| 4,757,725 | 7/1988 | Beugin | 74/422 |
| 5,695,024 | 12/1997 | Wan et al. | 49/116 X |
| 5,806,244 | 9/1998 | Tilli | 49/358 |
| 5,836,205 | 11/1998 | Meyer | 74/89.17 |

*Primary Examiner*—Allan D. Herrmann

[57] ABSTRACT

A motion control system controls the linear motion of a safety gate or other object, to prevent its skewing or binding, by two inter-connecting (meshed) gears, which also connect with (are respectively meshed with) two spaced apart, parallel, linear gear racks. The two gears extend between and interconnect the two gear racks, so that all four components are geared together, and have the same gear pitch. This forces the two spaced apart gear racks to track and move in lock-step with one another in a direction of motion aligned with and parallel to the gear racks, thus insuring linear movement of the member being moved (the safety gate here) irrespective of where on the member the moving member is pushed, pulled or otherwise acted on, i.e., even off-center, and without requiring critical edge guide channels, tracks, or the like. In this example a simple solenoid moves the safety gate with consistently low force.

2 Claims, 3 Drawing Sheets

SAFETY PROBLEM SOLUTION WITH MOVEMENT CONTROL SYSTEM

Disclosed is a simple, low force and low cost system and mechanism for improved reliability of the movement of a component or object, especially, one which must be moved linearly, such as repeatedly reciprocated, with reduced tendencies for irregular movement, skewing or binding in that movement, even if the component or object is being driven off-center or off axis. This movement control system can eliminate or reduce the criticality and/or cost and/or lubrication of the typical tracks, guide rods, ball bearings and/or rollers or the like normally required to insure non-sticking movement of linearly moved or other non-rotated movement components. It is of particular interest for improving safety protective systems by a more reliable and positive movement of safety gates, barriers, or other such safety members used for intermittently blocking human hand or finger ingress to moving machine parts, or the like. Problems with skewing, binding or controlling movement tolerances tend to be even more difficult when the object being moved is wide, that is, the dimension of the object transverse its movement direction is greater than its movement direction dimension, and the object is typically riding in guide channels or tracks at its outside lateral edges. Skewing forces can greatly increase normal forces between the corners of the object and its guide tracks which can lead to actual binding jams preventing full movement of the object.

In the exemplary embodiment herein, this movement control system is shown in one application for preventing skewing or binding of a reciprocally movable stapler safety gate being used to intermittently block inadvertent human body parts access into the closing jaws of a stapler. If such a safety gate does not close each time it is actuated, it can either present a safety problem, or cause a machine shutdown in the typical systems in which closure of the safety gate must be detected by a gate closure switch in order for the machine to operate. However, as noted, this low-cost movement control mechanism may also be used in various other embodiments for various other moving components. This movement control system allows linear movement of components even if the components are being moved or driven off-center, such as by a simple off-center acting solenoid drive, as shown in this embodiment, or various other simple drives.

As shown and described, this movement control system can be provided by a simple and low cost gear and gear rack system, having less slack or clearance from gear lash, and thus less skew allowance for the object, than a typical edge track mounting system. Binding tendencies are greatly reduced.

A specific feature of the specific embodiment(s) disclosed herein is to provide a motion control system for a safety gate system for human safety protection from moving machinery, wherein a safety gate must be repeatedly reliably moved relative to a mounting frame in a desired movement direction into a safety position, the improvement in said motion control system for said safety gate movement comprising first and second spaced apart elongated gear racks integral said safety gate, with both said first and second gear racks extending in said desired movement direction; and a rotatable gear train rotatably mounted to said mounting frame; said gear train interconnecting between said first and second gear racks to control the movement of said first gear rack relative to said second gear rack to insure said movement of said safety gate in said desired movement direction with restrained skewing.

Further specific features disclosed herein, individually or in combination, include those wherein said gear train consists of two inter-meshing gears extending between said first and second gear racks, and wherein said motion control system thereby provides said desired motion of said safety gate by insuring gear-coordinated movement of said first gear rack with said second gear rack; and/or wherein said gear train consists of two inter-meshing gears extending between and meshing with said first and second gear racks, and wherein said gears and said gear racks all have the same gear pitch; and/or wherein said gear train consists of two inter-meshing gears of the same diameter extending between and meshing with said first and second gear racks, and wherein said first and second gear racks are linear and parallel to one another and extend in said desired direction of movement, and wherein said motion control system thereby provides linear motion of said safety gate by insuring common movement of both said first and second gear racks; and/or in a motion control system for providing linear motion to a mechanical member which must be repeatedly reliably moved relative to a mounting frame in a desired movement direction, the improvement in said motion control system for said movement comprising first and second spaced apart elongated gear racks integral with said member, both said first and second gear racks extending in said desired movement direction; and a rotatable gear train rotatably mounted to said mounting frame; said gear train interconnecting between said first and second gear racks to racks to control the movement of said first gear rack relative to said second gear rack to insure said movement of said member in said desired movement direction with restrained skewing; and/or wherein said wherein said gear train consists of two inter-meshing gears extending between said first and second gear racks, and wherein said motion control system thereby provides said desired motion of said member by insuring gear-coordinated movement of said first gear rack with said second gear rack.; and/or wherein said wherein said gear train consists of two inter-meshing gears extending between and meshing with said first and second gear racks, and wherein said motion control system thereby provides linear motion of said member by insuring common movement of both said first and second gear racks; and/or wherein said gear train consists of two inter-meshing gears of the extending between and meshing with said first and second gear racks, and wherein said gears and said gear racks all have the same gear pitch, and wherein said first and second gear racks are linear and parallel to one another and extend in said desired direction of movement, and wherein said motion control system thereby provides linear motion of said member by insuring common movement of both said first and second gear racks in said same desired direction of movement; an/or wherein said gears are rotatably mounted to fixed gear axles which are non-interfering with said moving member and/or wherein said motion control system includes the absence of any laterally-confining edge guides.

As to specific components of the subject apparatus, or alternatives therefor, it will be appreciated that, as is normally the case, some such components are known per se in other apparatus or applications or patents which may be additionally or alternatively used herein. Any references cited, and their references, are incorporated by reference herein where appropriate for appropriate teachings of additional or alternative details, features, and/or technical background. What is well known to those skilled in the art need not be described here.

BRIEF DESCRIPTION OF THE DRAWINGS

Various of the above-mentioned and further features and advantages will be apparent from the specific apparatus and its operation described in the examples below, and the claims. Thus, the present invention will be better understood from this description of the specific illustrated embodiment, including the drawing figures (approximately to scale) wherein:

DESCRIPTION OF THE INVENTION

Figure 1:
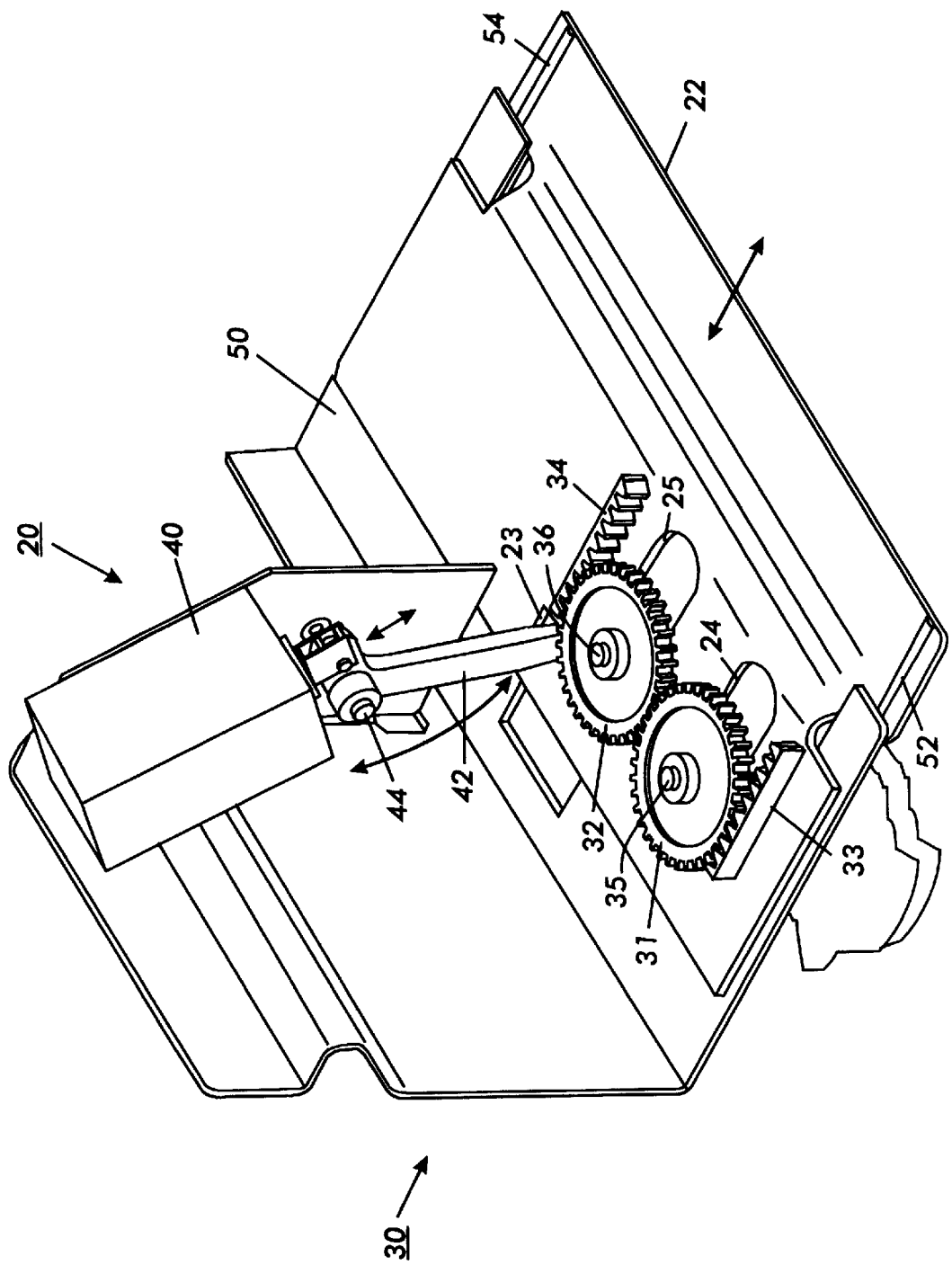
FIG. 1 is a perspective view of an exemplary subject linear motion control system.
Figure 2:
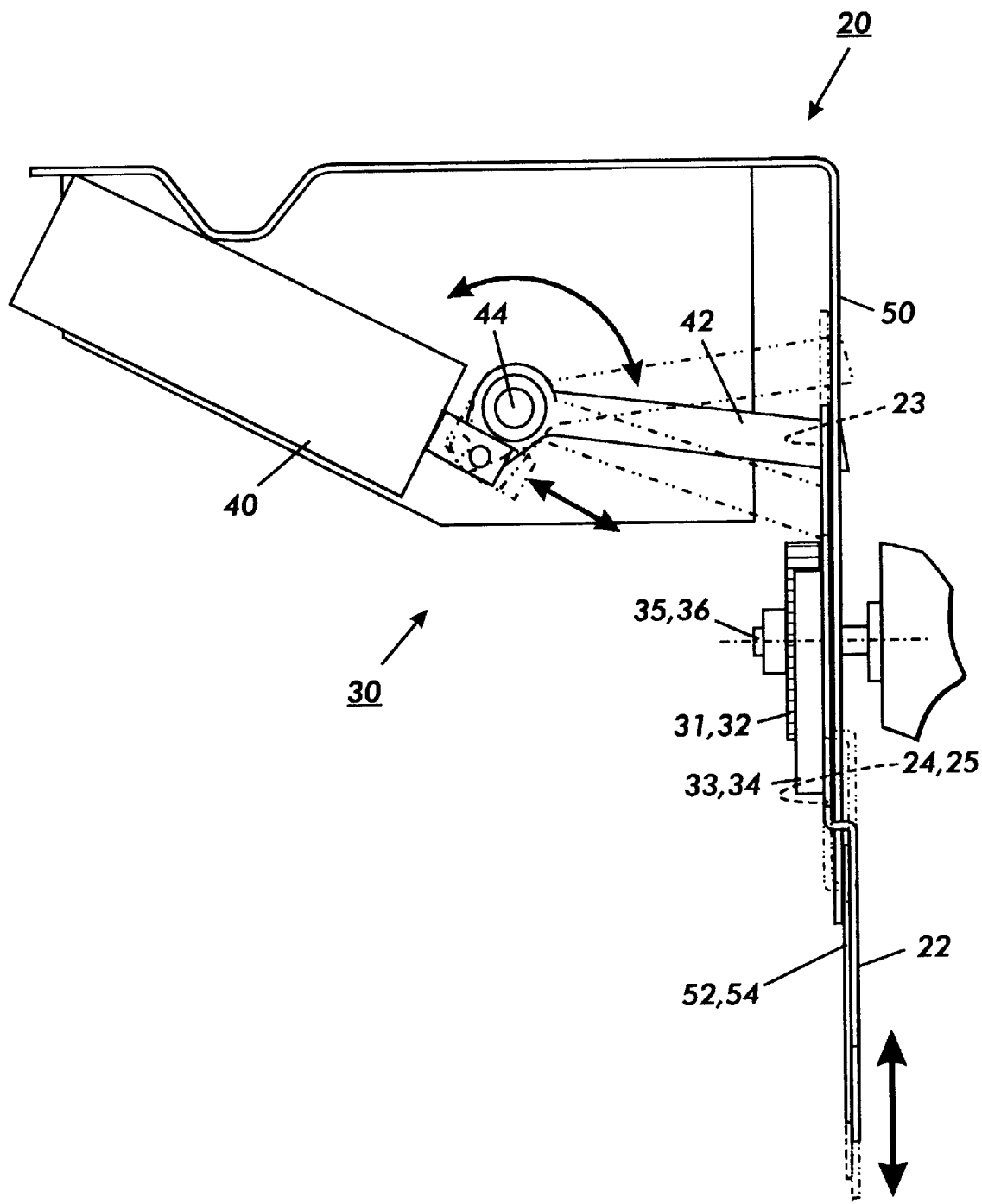
FIG. 2 is a side view of the linear motion control system of FIG. 1.
Figure 3:
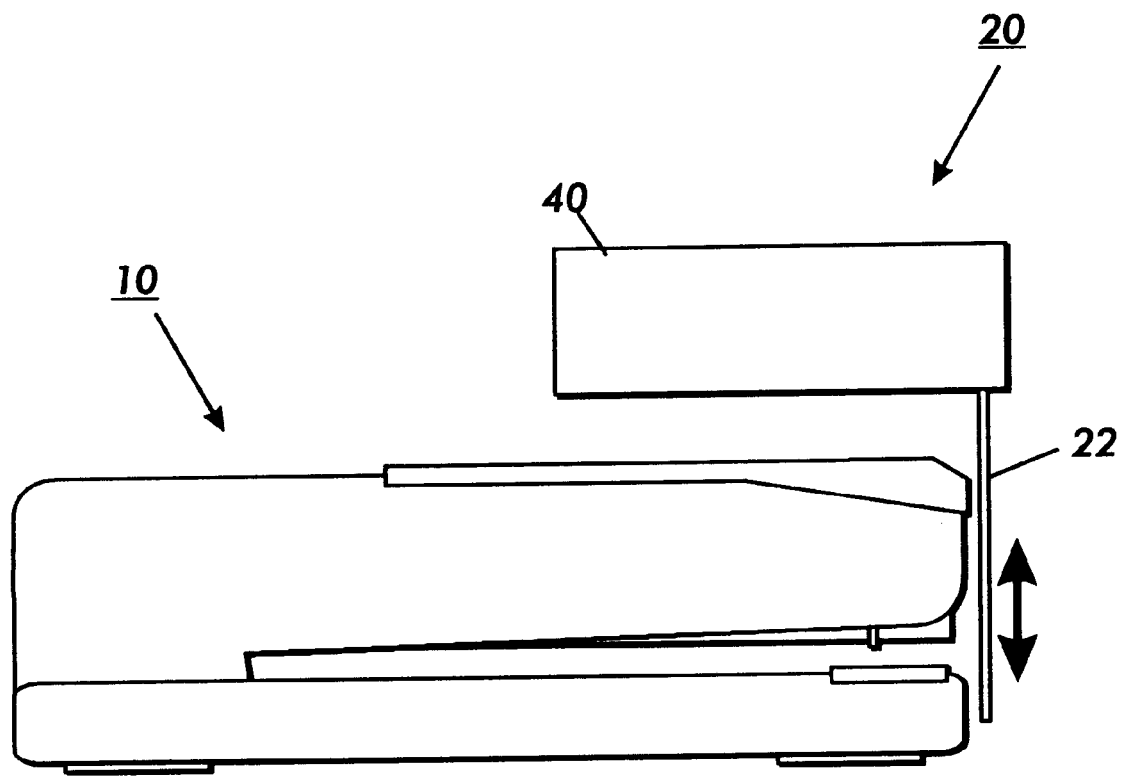
FIG. 3 is a schematic side view of one embodiment of an otherwise conventional stapling system with a safety gate system in which the safety gate movement is controlled by the FIG. 1 and FIG. 2 example of a subject linear motion control system, shown schematically.

Describing now in further detail this exemplary embodiment shown in the Figures, there is shown in FIG. 1 an otherwise conventional stapling system 10 with a safety system 20 incorporating and utilizing a subject motion control system 30, by way of one example thereof, as shown in more detail in the other Figures. The motion control system 30 insures the reliable linear motion of a safety gate 22 of the safety system 20 whenever that safety gate is actuated. It will be understood that the safety gate 22 here is one example of an object or component being moved with controlled movement, that is, controlled by the motion control system 30, or other embodiments thereof.

In this illustrated embodiment, the motion control system 30 controls the linear motion of the safety gate 22 by two equal diameter inter-connecting (meshed) conventional gears 31 and 32, which are also connecting with (respectively meshed with) two spaced apart, but parallel, linear gear racks 33 and 34. The two gears 31 and 32 extend between the two gear racks 33 and 34. Thus, all four components 31, 32, 33, 34 are geared together. This two-gear connection between the two gear racks 33 and 34 forces those two spaced apart gear racks 33 and 34 to move in lock-step with one another in a direction of motion aligned with and parallel to the two gear racks 33, 34, thus insuring linear movement of the member being moved (the gate 22 here) irrespective of where on the member the moving member is pushed, pulled or otherwise acted on. Here in this example a simple solenoid 40 linearly moves the gate 22 through a pivotal link 42 which is pivoting about an axis 44. The outer end of the arm or link 42 operatively engages an aperture 23 in the gate 22. The solenoid 40, via the link 42, thereby moves the safety gate 22 up when it is actuated. The gate can move down by gravity and/or spring loading or reversal of the solenoid. The two meshed gears 31 and 32 keep the gate in both its desired lateral and linear position throughout its movement, for straight line movement, by respectively continuously mating with the two rack 33, 34 gear profiles to keep each rack section in synchronism with the other. A conventional safety switch (not shown) can be provided to confirm the gate 22 reaching its safety position. Any incipient skew or imbalance in the movement of gate 22 will only change the rotational force on the gears and resist the gate 22 rotating to cause a skew and/or stubbing angle which could lock up the gate 22 movement in its side tracks or guides.

With the movement control system 30, as shown here, guide tracks 52, 54 may be simple slide plate surfaces, e.g., as part of a stationary mounting frame 50. That is, lateral edge-confining channels or tracks are not required here, since the edges of the member 22 need not be confined or restrained from lateral movement. That also reduces the overall cost of the system.

As shown in the specification and drawings of this embodiment, the two simple, identical, mutually engaged, and freely rotatable plastic gears 31 and 32 are simply conventionally rotatable about a conventional central axle mounting 35 and 36, respectively. These axles 35, 36 mounted fixed to the stationary frame 50 or other mounting member through slots 24, 25 in the driven member (the safety gate 22 here). As described and shown, these gears 31, 32 also respectively continuously engage, at their opposite, outer, sides, a spaced apart (by the two gear diameters) pair of linear gear racks 33, 34 on the, to insure the linear motion of member 22 and prevent its skewing and/or binding, which can otherwise be commonly experienced with other straight line motion guidance system such as rails, tracks, pins riding in slots, slide rods, or the like. Both of the gears and gear racks have the same gear pitch and gear teeth spacing. In effect, in this particular embodiment, the two inter-connecting gears inter-connecting the two spaced apart but parallel gear racks force the two gear racks to move in lock-step with one another, aligned in the direction of the gear racks, thus insuring linear movement of the member. This applies regardless of where the movement force is being applied to the gate 22, i.e., off-center engagement that would apply a rotational movement couple to the member 22 is compensated or corrected for by the movement control system 30.

As an additional feature, a simple coil or other spring can be mounted on and/or connected to either one of the two gears 31 or 32, for return motion of the gate 22, since forces applied to either gear apply only rotational forces thereto and the movement control system 30 will automatically convert them to purely linear movement forces.

All components or parts of the illustrated or other movement control system may be low cost plastic moldings, and the gear racks may even be integrally molded with the member to be moved in the same molding operation, as a single or unitary monolithic part, as shown.

Another or alternative embodiment is to provide an otherwise similar mechanism, but with the two gears not having the same diameters. As long as the gear pitch or toothing is the same, the same linear motion control can be provided. With a difference in gear sizes, then different positions, ratios and actuating distances could be used for the prime mover, return spring, position sensor, any dampening device, etc.

Alternatively, the gear racks could be curvilinear rather than strictly linear, in which case the moving member could be repeatedly moved in a precisely controlled arcuate or curvilinear path, instead of a fully linear path, with the amount of movement path curvature being proportional to the gear rack curvature.

While the embodiments disclosed herein are preferred, it will be appreciated from this teaching that- various alternatives, modifications, variations or improvements therein may be made by those skilled in the art, which are intended to be encompassed by the following claims.

What is claimed is:

1. In an safety gate motion control system for human safety protection from moving machinery, wherein a safety gate must be repeatedly reliably moved relative to a mounting frame in a desired movement direction into a safety position without skewing or binding, the improvement in said safety gate motion control system comprising;

first and second spaced apart elongated parallel linear gear racks integrally mounted to and moving with said safety gate, wherein both said first and second gear racks extend in said desired movement direction;

a rotatable intermeshing gear train of plural gears mounted to said mounting frame in a fixed position;

said safety gate having plural elongated slots extending in said desired movement direction;

wherein said plural gears are all rotatably mounted to said mounting frame by plural fixed gear axles;

wherein each of said gear axles extends through a respective said elongated slot in said safety gate so as to are non-interfering with movement of said safety gate in said desired movement direction;

said plural gears of said gear train positively gear connecting said first and second gear racks for common linear movement of both said first and second gear racks in the same direction to provide linear motion of said safety gate to insure said movement of said safety gate in said desired movement direction without skewing and without any laterally-confining edge guides.

2. The safety gate motion control system of claim 1, wherein said gear train consists of only two inter-meshing gears extending between and respectively meshing with said first and second gear racks, and wherein said gears and said gear racks all have the same gear pitch.

* * * * *